US012014465B2

(12) United States Patent
Tao (10) Patent No.: US 12,014,465 B2
(45) Date of Patent: Jun. 18, 2024

(54) TRACKING SYSTEM AND METHOD

(71) Applicant: HTC Corporation, Taoyuan (TW)

(72) Inventor: Sheng-Hui Tao, Taoyuan (TW)

(73) Assignee: HTC Corporation, Taoyuan (TW)

( * ) Notice: Subject to any disclaimer, the term of this patent is extended or adjusted under 35 U.S.C. 154(b) by 121 days.

(21) Appl. No.: 17/929,306

(22) Filed: Sep. 1, 2022

(65) Prior Publication Data

US 2023/0215112 A1    Jul. 6, 2023

Related U.S. Application Data

(60) Provisional application No. 63/266,516, filed on Jan. 6, 2022.

(51) Int. Cl.
*G06T 19/00* (2011.01)
*G06F 3/01* (2006.01)

(52) U.S. Cl.
CPC .......... *G06T 19/006* (2013.01); *G06T 19/003* (2013.01); *G06F 3/012* (2013.01)

(58) Field of Classification Search
CPC ...... G06F 3/012; G06T 19/003; G06T 19/006
See application file for complete search history.

(56) References Cited

U.S. PATENT DOCUMENTS

| 10,775,878 | B2 | 9/2020 | Stafford et al. | |
| 2012/0293506 | A1* | 11/2012 | Vertucci | G06F 3/012 |
| | | | | 345/419 |
| 2016/0125656 | A1* | 5/2016 | James | G02B 27/0093 |
| | | | | 345/633 |
| 2018/0219404 | A1* | 8/2018 | Urbach | B64C 39/024 |
| 2019/0172262 | A1* | 6/2019 | McHugh | G06F 3/011 |
| 2021/0142508 | A1* | 5/2021 | Azimi | G02B 27/017 |

FOREIGN PATENT DOCUMENTS

| CN | 108700941 A | 10/2018 |
| CN | 109791295 A | 5/2019 |
| CN | 110419018 A | 11/2019 |
| CN | 111399630 A | 7/2020 |
| CN | 112651288 A | 4/2021 |
| CN | 113379870 A | 9/2021 |
| JP | 5965410 B2 | 8/2016 |
| TW | 202015400 A | 4/2020 |

OTHER PUBLICATIONS

The office action of the corresponding Taiwanese application No. TW111149012 issued on Nov. 15, 2023.

* cited by examiner

*Primary Examiner* — Charles Tseng
(74) *Attorney, Agent, or Firm* — CKC & Partners Co., LLC (57) ABSTRACT

A tracking system and method are provided. At least one tracking device receives a first role configuration from a head-mounted display. The at least one tracking device determines at least one first spatial area from a spatial map information stored in a storage of the at least one tracking device based on the first role configuration. The at least one tracking device loads the at least one first spatial area into a memory of the at least one tracking device.

20 Claims, 5 Drawing Sheets

TRACKING SYSTEM AND METHOD

CROSS-REFERENCE TO RELATED APPLICATION

This application claims priority to U.S. Provisional Application Ser. No. 63/266,516, filed Jan. 6, 2022, which is herein incorporated by reference in its entirety.

BACKGROUND

Field of Invention

The present invention relates to a tracking system and method. More particularly, the present invention relates to a tracking system and method that can reduce the memory resource usage of a tracking device.

Description of Related Art

In recent years, various technologies related to virtual reality have developed rapidly, and various technologies and applications of head-mounted displays have been proposed one after another.

In the prior art, users can set up various tracking devices with self-tracking functions (e.g., tracking devices with inside-out cameras), and use these tracking devices to assist the head-mounted display to more accurately determine the spatial position of the object and the user.

Generally speaking, it is necessary to use the spatial map information of the head-mounted display to align the coordinate systems of the head-mounted display and the tracking device when using the tracking device for assisted positioning. However, since the head-mounted display needs to process map information in the entire environment space, the spatial map information stored by the head-mounted display is usually quite large. In addition, since the tracking device is generally a relatively lightweight device (such as a wearable device) with limited hardware resources. If all the spatial map information stored in the head-mounted display is loaded into the memory, it may cause a huge resource burden on the memory of the tracking device and reduce the operation efficiency.

Accordingly, there is an urgent need for a tracking technology that can reduce the memory resource usage of a tracking device.

SUMMARY

An objective of the present disclosure is to provide a tracking system. The tracking system comprises a head-mounted display and at least one tracking device. The head-mounted display is configured to store a spatial map information. The at least one tracking device is communicatively connected to the head-mounted display. The at least one tracking device receives the spatial map information from the head-mounted display, and stores the spatial map information in a storage of the at least one tracking device. The at least one tracking device receives a first role configuration from the head-mounted display. The at least one tracking device determines at least one first spatial area from the spatial map information based on the first role configuration. The at least one tracking device loads the at least one first spatial area into a memory of the at least one tracking device.

Another objective of the present disclosure is to provide a tracking method, which is adapted for use in a tracking system. The tracking system comprises a head-mounted display and at least one tracking device. The tracking method comprises following steps: determining at least one first spatial area from a spatial map information stored in a storage of the at least one tracking device by the at least one tracking device based on a first role configuration received from the head-mounted display; and loading the at least one first spatial area into a memory of the at least one tracking device by the at least one tracking device.

According to the above descriptions, the tracking technology (at least including the system and the method) provided by the present disclosure separates the area of the spatial map information through the head-mounted display, and transmits the role configuration to the tracking devices based on the operating range of each tracking devices. This enables each tracking device to determine the spatial area to be loaded into memory based on its role configuration. Since the present disclosure does not need to load all the spatial map information into the memory, the problem of the burden of memory resources in the prior art is solved. The tracking technology provided by the present disclosure can reduce the memory resource usage of the tracking device and improve the efficiency of resource utilization.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, a tracking system and method according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
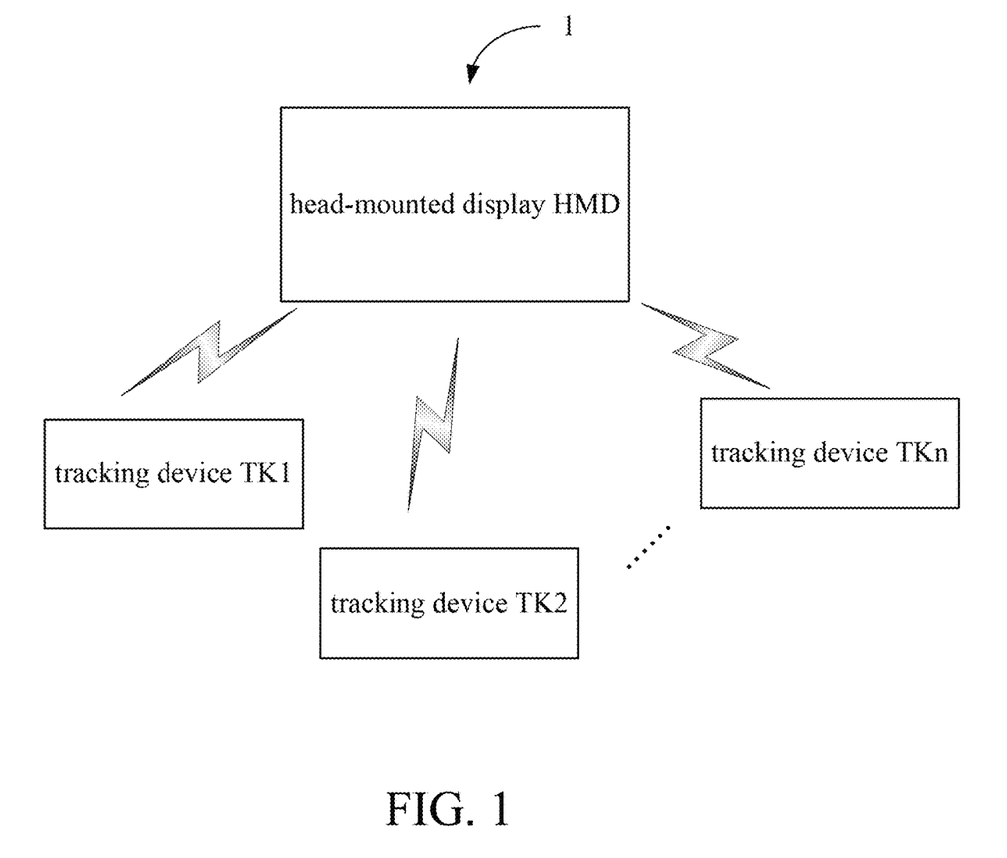
FIG. 1 is a schematic view depicting a tracking system of the first embodiment.

First, an application scenario of this embodiment is described, and a schematic diagram is depicted in FIG. 1. As shown in FIG. 1, in the first embodiment of the present disclosure, the tracking system 1 comprises a head-mounted display HMD and a plurality of tracking devices TK1, TK2, . . . , TKn. In this scenario, the user (not shown) perform operations through the head-mounted display HMD and the tracking devices TK1, TK2, . . . , TKn, where n is a positive integer. The tracking devices TK1, TK2, ..., TKn may be external devices with fixed positions or wearable devices. For example, the tracking devices TK1, TK2, ..., TKn can be respectively worn by the user on the user's hands, waist, and feet.

In addition, each of the tracking devices TK1, TK2, ..., TKn can be connected (i.e., a communicatively connection) with the head mounted display HMD through a wired network or a wireless network. The tracking devices TK1, TK2, ..., TKn are used to continuously generate data related to the tracking track (e.g., at a frequency of 10 times per second), and transmits the track-related data to the head-mounted display HMD.

Figure 2:
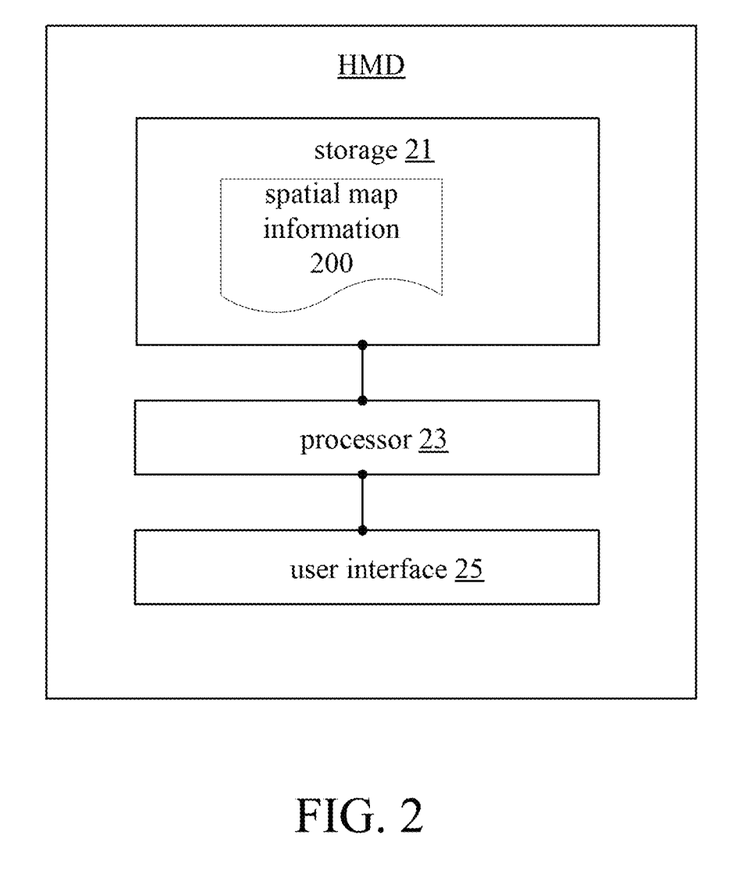
FIG. 2 is a schematic view depicting a head-mounted display of some embodiments.

Specifically, a schematic view of components of the head-mounted display HMD is shown in FIG. 2. The head mounted display HMD may comprise at least a storage 21 and a processor 23, and the processor 23 is electrically connected to the storage 21. In some embodiments, the head-mounted display HMD further comprises a user interface 25, and the processor 23 is electrically connected to the user interface 25.

Figure 3:
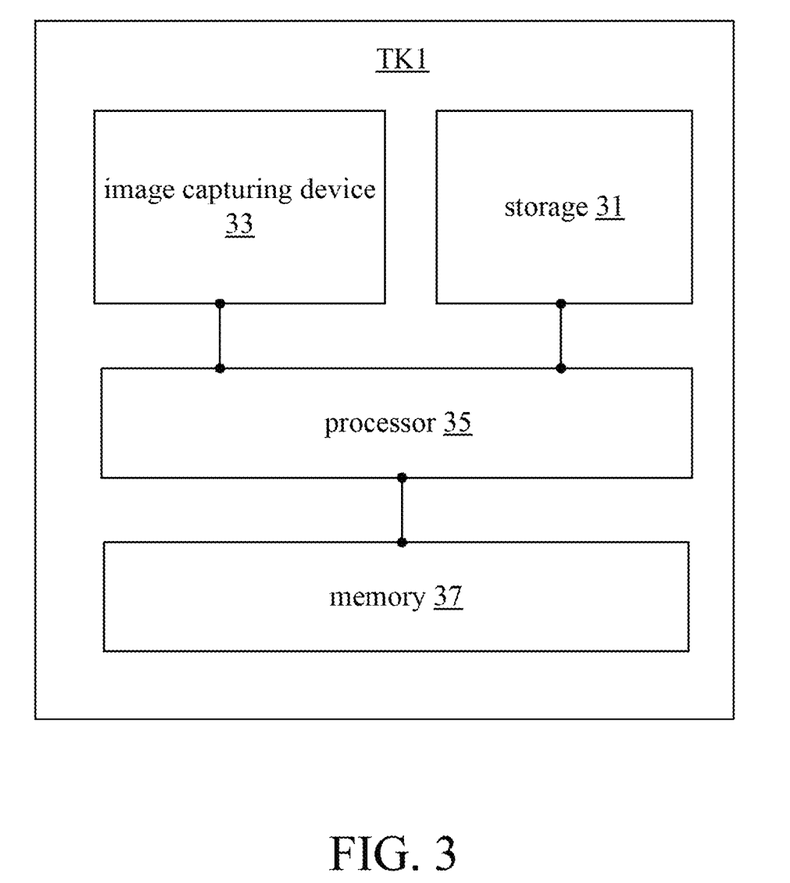
FIG. 3 is a schematic view depicting a tracking device of some embodiments.

In addition, a schematic view of components of the tracking device is shown in FIG. 3. Taking the tracking device TK1 as an example, the tracking device TK1 may at least comprise a storage 31, an image capturing device 33, a processor 35 and a memory 37, and the processor 35 is electrically connected to the storage 31, the image capturing device 33 and the memory 37.

It shall be appreciated that the storage 21 and the storage 31 may be a Universal Serial Bus (USB) disk, a hard disk, a Compact Disk (CD), a mobile disk, or any other storage medium or circuit known to those of ordinary skill in the art and having the same functionality. The processor 23 and the processor 35 may be any of various processors, Central Processing Units (CPUs), microprocessors, digital signal processors or other computing apparatuses known to those of ordinary skill in the art. The image capturing device 33 can be any device having an image capturing function, such as a device composed of a plurality of depth camera lenses. The memory 37 may be any storage medium or circuit capable of serving as a short-term data storage area for the processor.

It shall be appreciated that the above-mentioned FIG. 2 and FIG. 3 only illustrate the components related to the operation of the present disclosure of the head-mounted display HMD and the tracking device TK1. It should be understood that, in actual operation, the head-mounted display HMD and the tracking device TK1 may further comprise other necessary components for operation (e.g., a display screen and other transceiver interfaces).

In the present embodiment, the head-mounted display HMD stores a spatial map information 200. Specifically, the spatial map information 200 may be spatial map information generated by the head-mounted display HMD based on simultaneous localization and mapping (SLAM). It shall be appreciated that the spatial map information 200 may comprise the positions of all feature objects in the space, and the tracking devices TK1, TK2, ..., TKn can perform coordinate system alignment operation (i.e., map alignment operation) with the head-mounted display HMD by identifying the positions of the feature objects.

In the present embodiment, the head-mounted display HMD may predefine the spatial map information 200 to be composed of different preset shapes, such as a cuboid, a cylinder, a sphere, or other specific shapes. Specifically, in some embodiments, the head-mounted display HMD may separate the spatial map information 200 into a plurality of sub-regions corresponding to a preset shape, and each of the role configurations transmitted from the head-mounted display HMD to the tracking devices TK1, TK2, ..., TKn correspond to at least one of the sub-regions.

In some embodiment, the head-mounted display HMD may separate the spatial map information 200 into a plurality of sub-regions based on a plurality of preset shapes.

It shall be appreciated that the preset shape may be related to the operating range of the tracking devices TK1, TK2, ..., TKn. For example, if the tracking device TK1 is worn on the user, the head-mounted display HMD may define the sub-region as a cuboid block according to the general movement range of the user. For another example, if the tracking device TK2 is fixed on a holdable object (e.g., a stick), the head-mounted display HMD may define the sub-region as a sphere. For another example, if the tracking device TKn is an external device and is placed at a specific position, the head-mounted display HMD can define the sub-region as a cone-shaped space. Specifically, the head-mounted display HMD may determine an operating range of the at least one tracking device to determine the preset shape for separating the spatial map information.

In the present embodiment, the tracking devices TK1, TK2, ..., TKn receive the spatial map information 200 from the head-mounted display HMD, and store the spatial map information 200 in the storage 31 of the tracking devices TK1, TK2, ..., TKn.

In some embodiments, the head-mounted display HMD may adjust the content of the spatial map information 200 due to changes in the environment, and the head-mounted display HMD may transmit the adjusted spatial map information 200 to the tracking devices TK1, TK2, ..., TKn. Specifically, the head-mounted display HMD periodically transmits (e.g., at a frequency of every 5 minutes) the spatial map information 200 to the tracking devices TK1, TK2, ..., TKn to update the spatial map information 200 stored in the storage by the tracking devices TK1, TK2, ..., TKn.

Next, in the present embodiment, the head-mounted display HMD may assign a corresponding role configuration according to the different operation ways of the tracking devices TK1, TK2, ..., TKn. Specifically, the tracking devices TK1, TK2, ..., TKn may receive the corresponding role configuration (e.g., the first role configuration) from the head-mounted display HMD.

It shall be appreciated that each of the role configurations may be related to the operating range of the tracking devices TK1, TK2, ..., TKn. For example, when the head-mounted display HMD determines that the tracking device TK1 is worn on the user's feet, the tracking device TK1 can be assigned to the role configuration whose usage part is "foot". For another example, when the head-mounted display HMD determines that the tracking device TK2 is worn on the user's hand, the tracking device TK2 can be assigned to the role configuration whose usage part is "hand".

In some embodiments, the head-mounted display HMD may further assign the role configurations of the tracking devices TK1, TK2, ..., TKn on each body part of the user through the user interface 25. For example, the user interface 25 of the head-mounted display HMD may remind the user to wear the hand tracking device TK1, and assigns the role configuration of "hand" to the tracking device TK1.

Next, in the present embodiment, each of the tracking devices TK1, TK2, ..., TKn can determine at least one first spatial area (i.e., at least one sub-region corresponding to the role configuration) from the spatial map information 200 based on the received role configuration. Finally, each of the tracking devices TK1, TK2, ..., TKn can load the at least one first spatial area into the memory 37 of each of the tracking devices TK1, TK2, . . . , TKn.

In some embodiments, each of the at least one first spatial area corresponds to a partial area of the spatial map information 200 (i.e., at least one sub-region of the spatial map information 200).

Figure 4:
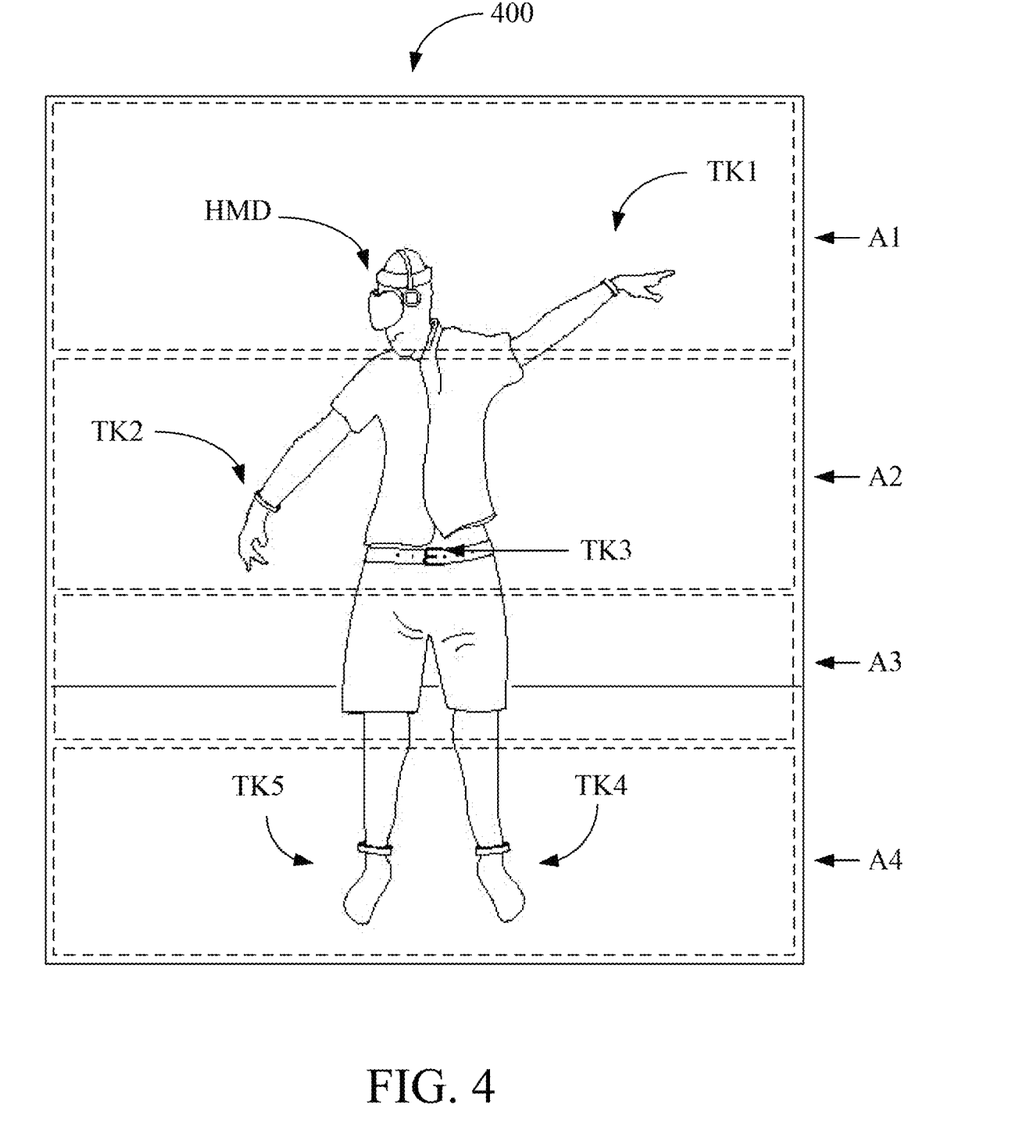
FIG. 4 is a schematic view depicting a operation of the tracking system of some embodiments.

For ease of understanding, please refer to FIG. 4. FIG. 4 illustrates a schematic view 400 of the operation of the tracking system. In FIG. 4, the user wears the head-mounted display HMD, and wears the tracking devices TK1 and TK2 in the "hand position", the tracking device TK3 in the "waist position", and the tracking devices TK4 and TK5 in the "foot position".

In the present example, the head-mounted display HMD separates the spatial map information 200 into four sub-regions A1, A2, A3, and A4, respectively. It shall be appreciated that the sub-regions A1, A2, A3, and A4 are three-dimensional regions (e.g., rectangular parallelepiped regions) extending with the user as the center in the space.

In the present example, the head-mounted display HMD may assign the tracking devices TK1 and TK2 as the "hand" role configuration. The tracking devices TK1 and TK2 may only load the sub-regions A1 and A2 in the spatial map information 200 into the memory 37. The head-mounted display HMD may assign the tracking device TK3 as the "waist" role configuration. The tracking device TK3 may only load the sub-region A2 in the spatial map information 200 into the memory 37. The head-mounted display HMD may assign the tracking devices TK4 and TK5 as the "foot" role configuration. The tracking devices TK4 and TK5 may only load the sub-regions A3 and A4 in the spatial map information 200 into the memory 37.

In some embodiments, the tracking devices TK1, TK2, . . . , TKn further comprise the image capturing device 33 as shown in FIG. 3, and the image capturing device 33 is configured to generate a real-time image corresponding to a field of view. Specifically, the tracking devices TK1, TK2, . . . , TKn perform a map alignment operation with the head-mounted display HMD based on the at least one first spatial area loaded in the memory 37 and the real-time image.

For example, the tracking devices TK1, TK2, . . . , TKn may perform the map alignment operation with the head-mounted display HMD by comparing the plurality of feature objects corresponding to the at least one first spatial area with the real-time image. It shall be appreciated that each of the feature objects comprises at least one of a key frame, a key point, or a combination thereof.

In some embodiments, each of the tracking devices TK1, TK2, . . . , TKn may dynamically adjust the content loaded into the memory 37 based on changes of the role configuration. Specifically, the tracking devices TK1, TK2, . . . , TKn receive new role configurations (e.g., the second role configuration) from the head-mounted display HMD. Next, each of the tracking devices TK1, TK2, . . . , TKn adjusts and loads at least one second spatial area to the memory 37 based on the new role configuration, and the at least one second spatial area is different from the at least one first spatial area.

According to the above descriptions, the tracking system 1 provided by the present disclosure separates the area of the spatial map information through the head-mounted display, and transmits the role configuration to the tracking devices based on the operating range of each tracking devices. This enables each tracking device to determine the spatial area to be loaded into memory based on its role configuration. Since the present disclosure does not need to load all the spatial map information into the memory, the problem of the burden of memory resources in the prior art is solved. The tracking technology provided by the present disclosure can reduce the memory resource usage of the tracking device and improve the efficiency of resource utilization.

Figure 5:
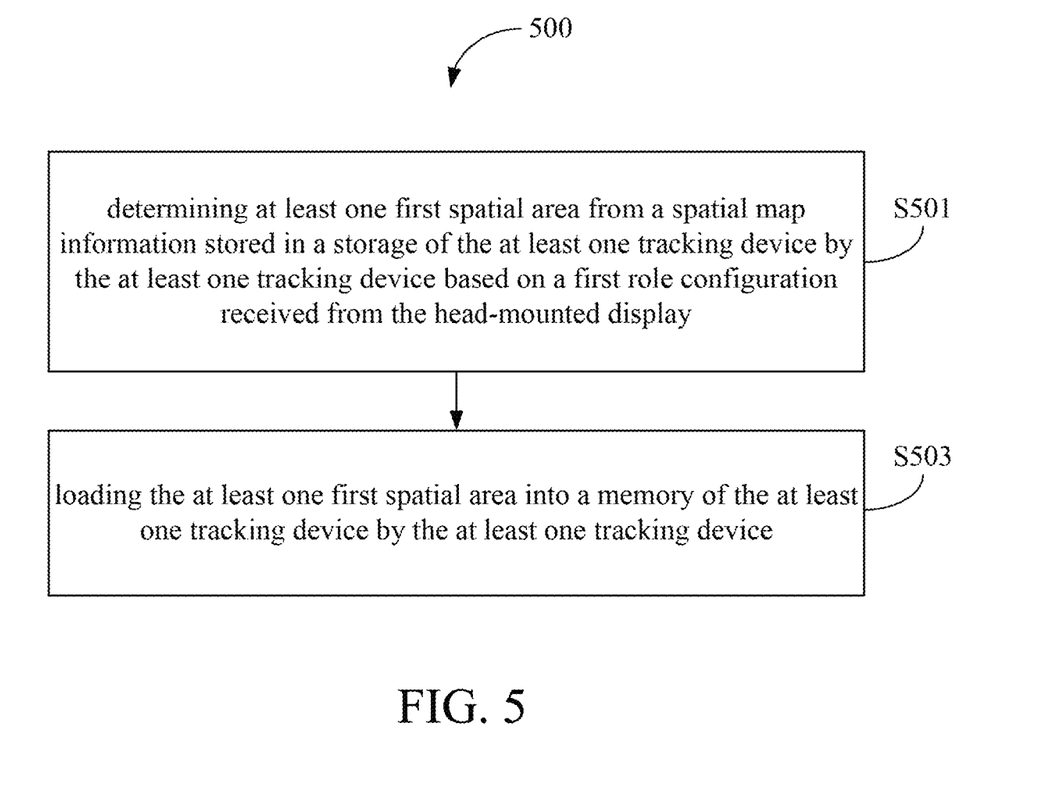
FIG. 5 is a partial flowchart depicting a tracking method of the second embodiment.

A second embodiment of the present disclosure is a tracking method and a flowchart thereof is depicted in FIG. 5. The tracking method 500 is adapted for a tracking system (e.g., the tracking system 1 of the first embodiment). The tracking system comprises a head-mounted display and at least one tracking device (e.g., the head-mounted display HMD and the tracking devices TK1, TK2, . . . , TKn of the first embodiment). The tracking method 500 determines the content loaded into the memory of the tracking device through steps S501 to S503.

In the step S501, the at least one tracking device determines at least one first spatial area from a spatial map information stored in a storage of the at least one tracking device based on a first role configuration received from the head-mounted display. Next, in the step S503, the at least one tracking device loads the at least one first spatial area into a memory of the at least one tracking device.

In some embodiments, wherein the first role configuration is related to an operating range of the at least one tracking device, and each of the at least one first spatial area corresponds to a partial area of the spatial map information.

In some embodiments, the tracking method 500 further comprises following steps: updating, by the at least one tracking device, the spatial map information stored in the storage, by periodically receiving the spatial map information from the head-mounted display.

In some embodiments, the tracking method 500 further comprises following steps: separating the spatial map information into a plurality of sub-regions corresponding to a preset shape by the head-mounted display; wherein the first role configuration received by the at least one tracking device corresponds to at least one of the sub-regions.

In some embodiments, the tracking method 500 further comprises following steps: determining an operating range of the at least one tracking device by the head-mounted display to determine the preset shape for separating the spatial map information.

In some embodiments, the at least one tracking device further comprises an image capturing device, the image capturing device is configured to generate a real-time image corresponding to a field of view, and the tracking method 500 further comprises following steps: performing a map alignment operation with the head-mounted display by the at least one tracking device based on the at least one first spatial area loaded in the memory and the real-time image.

In some embodiments, the tracking method 500 further comprises following steps: comparing a plurality of feature objects corresponding to the at least one first spatial area with the real-time image by the at least one tracking device to perform the map alignment operation with the head-mounted display.

In some embodiments, each of the feature objects comprises at least one of a key frame, a key point, or a combination thereof.

In some embodiments, the head-mounted display further comprises a user interface, and the tracking method 500 further comprises following steps: assisting a user to set the first role configuration corresponding to the at least one tracking device through the user interface by the head-mounted display; wherein each of the at least one tracking device corresponds to a body part of the user.

In some embodiments, the tracking method 500 further comprises following steps: receiving a second role configuration from the head-mounted display by the at least one tracking device; and adjusting at least one second spatial area loaded in the memory based on the second role configuration by the at least one tracking device; wherein the at least one second spatial area is different from the at least one first spatial area.

In addition to the aforesaid steps, the second embodiment can also execute all the operations and steps of the tracking system 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

The tracking method described in the second embodiment may be implemented by a computer program having a plurality of codes. The computer program may be a file that can be transmitted over the network, or may be stored into a non-transitory computer readable storage medium. After the codes of the computer program are loaded into an electronic system (e.g., the tracking system 1), the computer program executes the tracking method as described in the second embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage medium with the same function and well known to those of ordinary skill in the art.

It shall be appreciated that in the specification and the claims of the present disclosure, some words (e.g., role configuration, spatial area, etc.) are preceded by terms such as "first" and "second", and these terms of "first" and "second" are only used to distinguish these different words. For example, the "first" and "second" role configurations are only used to indicate the role configurations used in different operations.

According to the above descriptions, the tracking technology (at least including the system and the method) provided by the present disclosure separates the area of the spatial map information through the head-mounted display, and transmits the role configuration to the tracking devices based on the operating range of each tracking devices. This enables each tracking device to determine the spatial area to be loaded into memory based on its role configuration. Since the present disclosure does not need to load all the spatial map information into the memory, the problem of the burden of memory resources in the prior art is solved. The tracking technology provided by the present disclosure can reduce the memory resource usage of the tracking device and improve the efficiency of resource utilization.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A tracking system, comprising:
   a head-mounted display, being configured to store a spatial map information; and
   at least one tracking device, being communicatively connected to the head-mounted display, and being configured to perform operations comprising:
      receiving the spatial map information from the head-mounted display, and storing the spatial map information in a storage of the at least one tracking device;
      receiving a first role configuration from the head-mounted display;
      determining at least one first spatial area from the spatial map information based on the first role configuration; and
      loading the at least one first spatial area into a memory of the at least one tracking device.

2. The tracking system of claim 1, wherein the first role configuration is related to an operating range of the at least one tracking device, and each of the at least one first spatial area corresponds to a partial area of the spatial map information.

3. The tracking system of claim 1, wherein the head-mounted display further periodically transmits the spatial map information to the at least one tracking device to update the spatial map information stored in the storage by the at least one tracking device.

4. The tracking system of claim 1, wherein the head-mounted display is further configured to perform following operations:
   separating the spatial map information into a plurality of sub-regions corresponding to a preset shape;
   wherein the first role configuration received by the at least one tracking device corresponds to at least one of the plurality of sub-regions.

5. The tracking system of claim 4, wherein the head-mounted display is further configured to perform following operations:
   determining an operating range of the at least one tracking device to determine the preset shape for separating the spatial map information.

6. The tracking system of claim 1, wherein the at least one tracking device further comprises:
   an image capturing device, wherein the image capturing device is configured to generate a real-time image corresponding to a field of view;
   wherein the at least one tracking device further performs following operations:
      performing a map alignment operation with the head-mounted display based on the at least one first spatial area loaded in the memory and the real-time image.

7. The tracking system of claim 6, wherein the at least one tracking device is further configured to perform following operations:
   comparing a plurality of feature objects corresponding to the at least one first spatial area with the real-time image to perform the map alignment operation with the head-mounted display.

8. The tracking system of claim 7, wherein each of the plurality of feature objects comprises at least one of a key frame, a key point, or a combination thereof.

9. The tracking system of claim 1, wherein the head-mounted display further comprises:
a user interface;
wherein the head-mounted display further performs following operations:
assisting a user to set the first role configuration corresponding to the at least one tracking device through the user interface;
wherein each of the at least one tracking device corresponds to a body part of the user.

10. The tracking system of claim 1, wherein the at least one tracking device is further configured to perform following operations:
receiving a second role configuration from the head-mounted display; and
adjusting at least one second spatial area loaded in the memory based on the second role configuration;
wherein the at least one second spatial area is different from the at least one first spatial area.

11. A tracking method, being adapted for use in a tracking system, wherein the tracking system comprises a head-mounted display and at least one tracking device, and the tracking method comprises:
determining at least one first spatial area from a spatial map information stored in a storage of the at least one tracking device by the at least one tracking device based on a first role configuration received from the head-mounted display; and
loading the at least one first spatial area into a memory of the at least one tracking device by the at least one tracking device.

12. The tracking method of claim 11, wherein the first role configuration is related to an operating range of the at least one tracking device, and each of the at least one first spatial area corresponds to a partial area of the spatial map information.

13. The tracking method of claim 11, wherein the tracking method further comprises:
updating, by the at least one tracking device, the spatial map information stored in the storage, by periodically receiving the spatial map information from the head-mounted display.

14. The tracking method of claim 11, wherein the tracking method further comprising following steps:
separating the spatial map information into a plurality of sub-regions corresponding to a preset shape by the head-mounted display;
wherein the first role configuration received by the at least one tracking device corresponds to at least one of the plurality of sub-regions.

15. The tracking method of claim 14, wherein the tracking method further comprises following steps:
determining an operating range of the at least one tracking device by the head-mounted display to determine the preset shape for separating the spatial map information.

16. The tracking method of claim 11, wherein the at least one tracking device further comprises an image capturing device, the image capturing device is configured to generate a real-time image corresponding to a field of view, and the tracking method further comprises following steps:
performing a map alignment operation with the head-mounted display by the at least one tracking device based on the at least one first spatial area loaded in the memory and the real-time image.

17. The tracking method of claim 16, wherein the tracking method further comprises following steps:
comparing a plurality of feature objects corresponding to the at least one first spatial area with the real-time image by the at least one tracking device to perform the map alignment operation with the head-mounted display.

18. The tracking method of claim 17, wherein each of the plurality of feature objects comprises at least one of a key frame, a key point, or a combination thereof.

19. The tracking method of claim 11, wherein the head-mounted display further comprises a user interface, and the tracking method further comprises following steps:
assisting a user to set the first role configuration corresponding to the at least one tracking device through the user interface by the head-mounted display;
wherein each of the at least one tracking device corresponds to a body part of the user.

20. The tracking method of claim 11, wherein the tracking method further comprises following steps:
receiving a second role configuration from the head-mounted display by the at least one tracking device; and
adjusting at least one second spatial area loaded in the memory based on the second role configuration by the at least one tracking device;
wherein the at least one second spatial area is different from the at least one first spatial area.

* * * * *